(12) United States Patent
Kruger et al.

(10) Patent No.: US 9,829,049 B2
(45) Date of Patent: Nov. 28, 2017

(54) TRANSMISSION OR CLUTCH DIRECT COOLING TUBE (71) Applicants: Ronald D Kruger, Ann Arbor, MI (US); Tomislav Stajic, Belle River (CA)

(72) Inventors: Ronald D Kruger, Ann Arbor, MI (US); Tomislav Stajic, Belle River (CA)

(73) Assignee: FCA US LLC, Auburn Hills, MI (US)

( * ) Notice: Subject to any disclaimer, the term of this patent is extended or adjusted under 35 U.S.C. 154(b) by 340 days.

(21) Appl. No.: 14/641,481

(22) Filed: Mar. 9, 2015

(65) Prior Publication Data

US 2016/0265598 A1 Sep. 15, 2016

(51) Int. Cl.
| F16D 13/72 | (2006.01) |
| F16H 57/04 | (2010.01) |
| F16H 3/097 | (2006.01) |
| F16H 3/00 | (2006.01) |

(52) U.S. Cl.
CPC ......... *F16D 13/72* (2013.01); *F16H 57/0412* (2013.01); *F16H 57/0423* (2013.01); *F16H 57/0471* (2013.01); *F16H 57/0494* (2013.01); *F16H 3/006* (2013.01); *F16H 3/097* (2013.01)

(58) Field of Classification Search
CPC ....................................................... F16D 13/72
See application file for complete search history.

(56) References Cited

U.S. PATENT DOCUMENTS

| 3,181,674 A | 5/1965 | Marland |
| 4,023,661 A | 5/1977 | Flotow |
| 4,560,048 A | 12/1985 | Flotow |
| 4,633,938 A * | 1/1987 | Schunck ............. F16H 57/0493 165/47 |
| 6,073,443 A * | 6/2000 | Okada ..................... F16H 39/14 60/456 |

(Continued)

FOREIGN PATENT DOCUMENTS

| DE | 19710930 A1 | 10/1997 |
| EP | 2146117 A1 | 1/2010 |
| GB | 2478222 A | 8/2011 |

OTHER PUBLICATIONS

International Search Report and Written Opinion dated Apr. 21, 2016 for International Application No. PCT/US2016/016579, International Filing Date Feb. 4, 2016.

*Primary Examiner* — Mark A Manley
(74) *Attorney, Agent, or Firm* — Ralph E Smith (57) ABSTRACT

A cooling assembly fluidly communicating with a vehicle cooling system includes a coolant tube and a mounting plate. The cooling assembly is configured for cooling a support bearing disposed in a dual clutch transmission. The coolant tube includes (i) an inlet end that receives a cooling medium, (ii) an outlet end that returns the cooling medium to the vehicle cooling system and (iii) a heat transfer portion incorporated between the inlet end and the outlet end. The mounting plate has a plate body including a bearing opposing surface and a transmission housing opposing surface. The bearing opposing surface contacts the support bearing. The heat transfer portion of the coolant tube is attached to the mounting plate such that cooling medium communicated through the coolant tube reduces temperature of the mounting plate and therefore the support bearing.

20 Claims, 7 Drawing Sheets

(56) References Cited

U.S. PATENT DOCUMENTS

| | | | |
|---|---|---|---|
| 6,715,597 | B1 | 4/2004 | Buchanan |
| 8,402,993 | B2 | 3/2013 | Lundberg |
| 8,585,526 | B2 * | 11/2013 | Beutler ................. F16H 57/037 |
| | | | 475/161 |
| 8,851,028 | B2 | 10/2014 | Pickelman, Jr. |
| 2011/0100779 | A1 * | 5/2011 | Wheals .................. F16D 13/70 |
| | | | 192/113.3 |
| 2013/0134005 | A1 | 5/2013 | Kirchhoffer |
| 2014/0174876 | A1 | 6/2014 | Meyer |

* cited by examiner

TRANSMISSION OR CLUTCH DIRECT COOLING TUBE

FIELD

The present application relates generally to transmissions or clutches that incorporate a support bearing and, more particularly, to a cooling assembly fluidly communicating with a vehicle cooling system for cooling the support bearing.

BACKGROUND

Transmissions are provided in motor vehicles in many configurations for providing speed-changing gears between an engine and a drive axle. One such example is a dual dry clutch transmission. In general, a dual dry clutch transmission includes a pair of gearboxes operating in parallel, each with its own clutch and allowing for the selection and engagement of subsequent gears. The dual dry clutch transmission provides engagement of subsequent gears while the prior gear remains engaged. In one configuration, a dual dry clutch transmission includes a dual clutch housing that is supported in a transmission housing by a support bearing. During use, the dual clutch housing can operate at high revolutions per minute. Moreover, as the dual clutches operate in a dry or oil-less environment, the surrounding temperatures tend to increase. In some operating scenarios it is potentially challenging to sufficiently cool the support bearing. Thus, while these dual clutch transmissions work for their intended purpose, there is a need for improvement in the relevant art.

SUMMARY

In accordance with an aspect of the invention, a cooling assembly fluidly communicating with a vehicle cooling system includes a coolant tube and a mounting plate. The cooling assembly is configured for cooling a support bearing disposed in a dual clutch transmission. In one exemplary implementation, the coolant tube includes (i) an inlet end that receives a cooling medium from the vehicle cooling system, (ii) an outlet end that returns the cooling medium to the vehicle cooling system and (iii) a heat transfer portion incorporated between the inlet end and the outlet end. The mounting plate has a plate body including a bearing opposing surface and a transmission housing opposing surface. The bearing opposing surface contacts the support bearing. The heat transfer portion of the coolant tube is attached to the mounting plate such that cooling medium communicated through the coolant tube reduces temperature of the mounting plate and therefore the support bearing.

According to other exemplary features, the coolant tube and the mounting plate are both formed of metal. The coolant tube is attached to the mounting plate by a metal-joining process. In one example the coolant tube is brazed to the mounting plate. The mounting plate further includes a first end, a second end and an intermediate portion that connects the first and second ends. The plate body has a generally crescent shape. The mounting plate body surrounds more than half of the support bearing. The bearing opposing surface of the mounting plate body is configured to engage three lobes radially extending from the support bearing. The lobes extend about 120 degrees relative to each other.

According to additional exemplary features, the coolant tube further comprise (i) a first connecting portion that connects the inlet end to the heat transfer portion and (ii) a second connecting portion that connects the heat transfer portion to the outlet end. The transmission housing opposing surface of the mounting plate contacts a transmission housing of the dual clutch transmission. The coolant tube is configured to pass through an opening defined in the transmission housing. The coolant tube is formed of copper. The mounting plate is formed of stainless steel. The mounting plate has a thickness measured between the bearing opposing surface and the transmission opposing surface of between 1 and 2 mm. The mounting plate thickness in one example is 1.6 mm.

In accordance with another aspect of the invention, a cooling assembly fluidly communicating with a vehicle cooling system includes a coolant tube and a mounting plate. The cooling assembly is configured for cooling a support bearing disposed in a dual clutch transmission. In one exemplary implementation, the coolant tube includes (i) an inlet end that receives a cooling medium from the vehicle cooling system, (ii) an outlet end that returns the cooling medium to the vehicle cooling system and (iii) a heat transfer portion incorporated between the inlet end and the outlet end. The mounting plate has a crescent shaped plate body that extends between a first plate end and a second plate end. The plate body has an intermediate portion that wraps around a substantial portion of the support bearing. The mounting plate includes a bearing opposing surface and a transmission housing opposing surface. The bearing opposing surface contacts the support bearing. The heat transfer portion of the coolant tube is attached to the intermediate portion of the mounting plate such that cooling medium communicated through the coolant tube reduces temperature of the mounting plate and therefore the support bearing.

According to additional exemplary features, the bearing opposing surface of the mounting plate body is configured to engage three lobes radially extending from the support bearing. The lobes extend about 120 degrees relative to each other such that the intermediate portion of the plate body wraps around more than half of the support bearing.

According to still other exemplary features, the coolant tube further comprises (i) a first connecting portion that connects the inlet end to the heat transfer portion and (ii) a second connecting portion that connects the heat transfer portion to the outlet end. The transmission housing opposing surface of the mounting plate contacts a transmission housing of the dual clutch transmission. The coolant tube is configured to pass through an opening defined in the transmission housing. The mounting plate is formed of stainless steel and the coolant tube is formed of copper. The coolant tube is brazed to the mounting plate facilitating heat transfer properties between the mounting plate and the coolant tube.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DESCRIPTION

Figure 1:
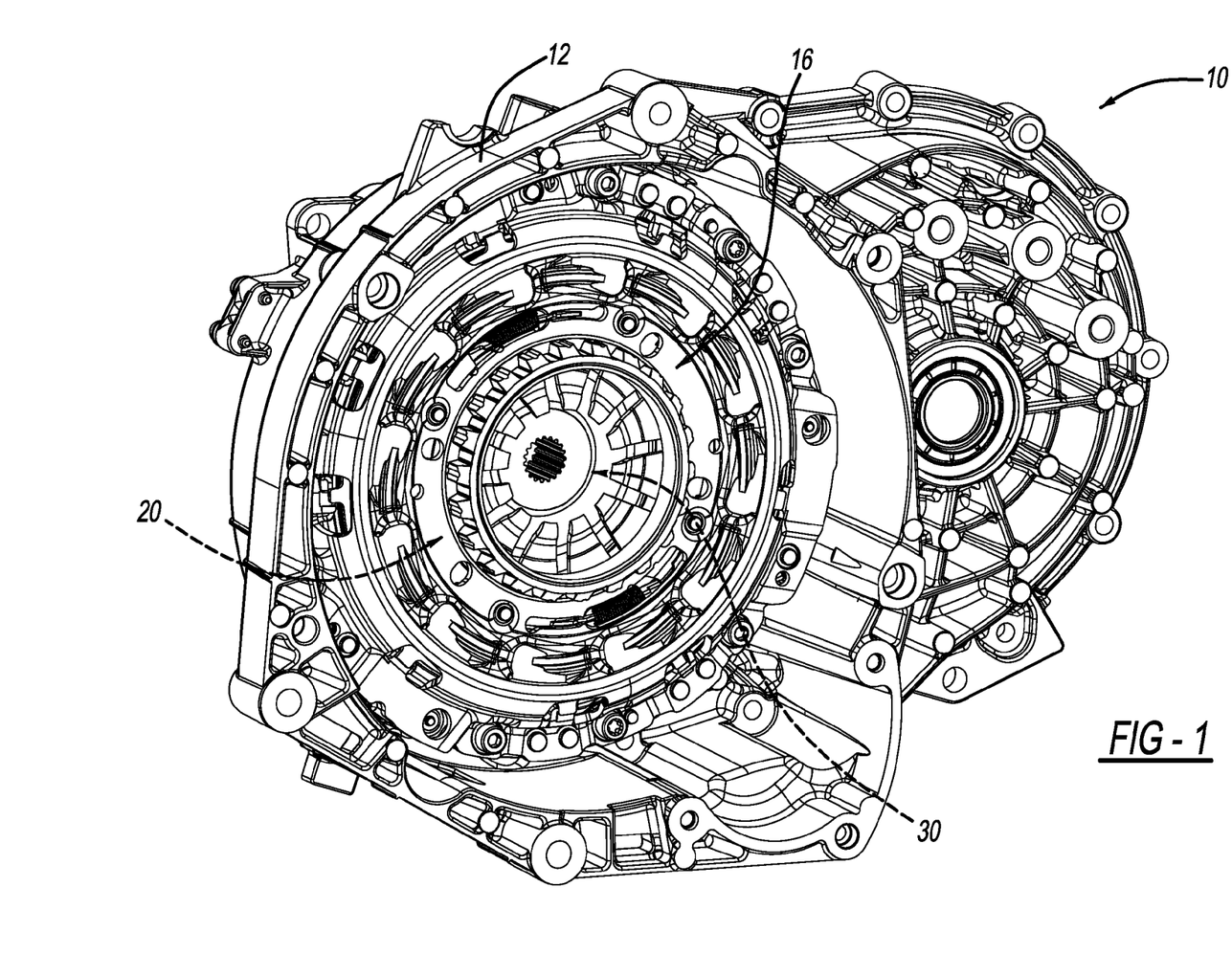
FIG. 1 is a front perspective view of a dual dry clutch transmission having a transmission housing that supports a dual clutch assembly and incorporates a cooling assembly according to the principles of the present disclosure.
Figure 4:
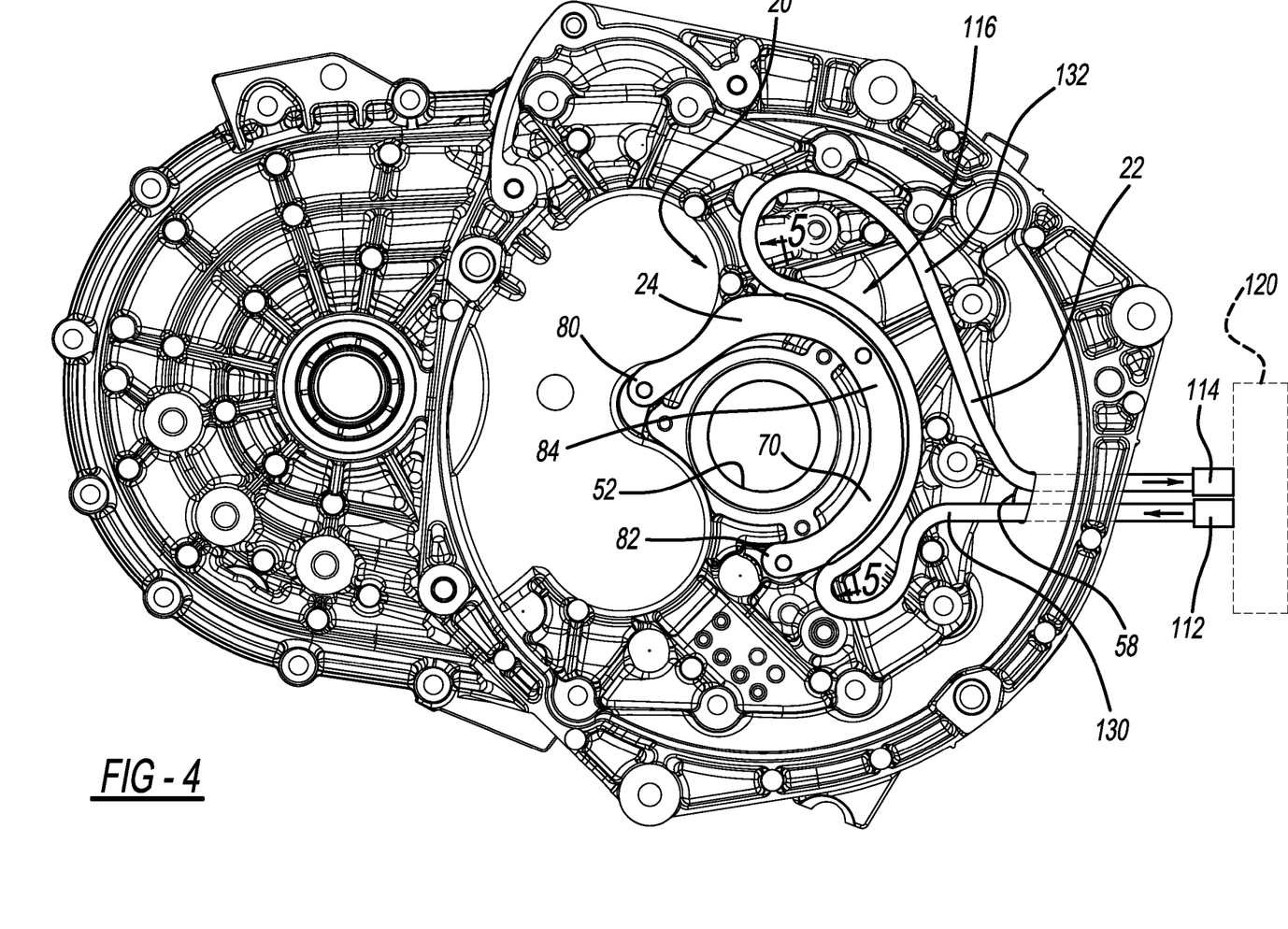
FIG. 4 is a front perspective view of the transmission housing of FIG. 3 and shown with the coolant tube and mounting plate attached to the housing and with the dual clutch assembly removed.
Figure 6:
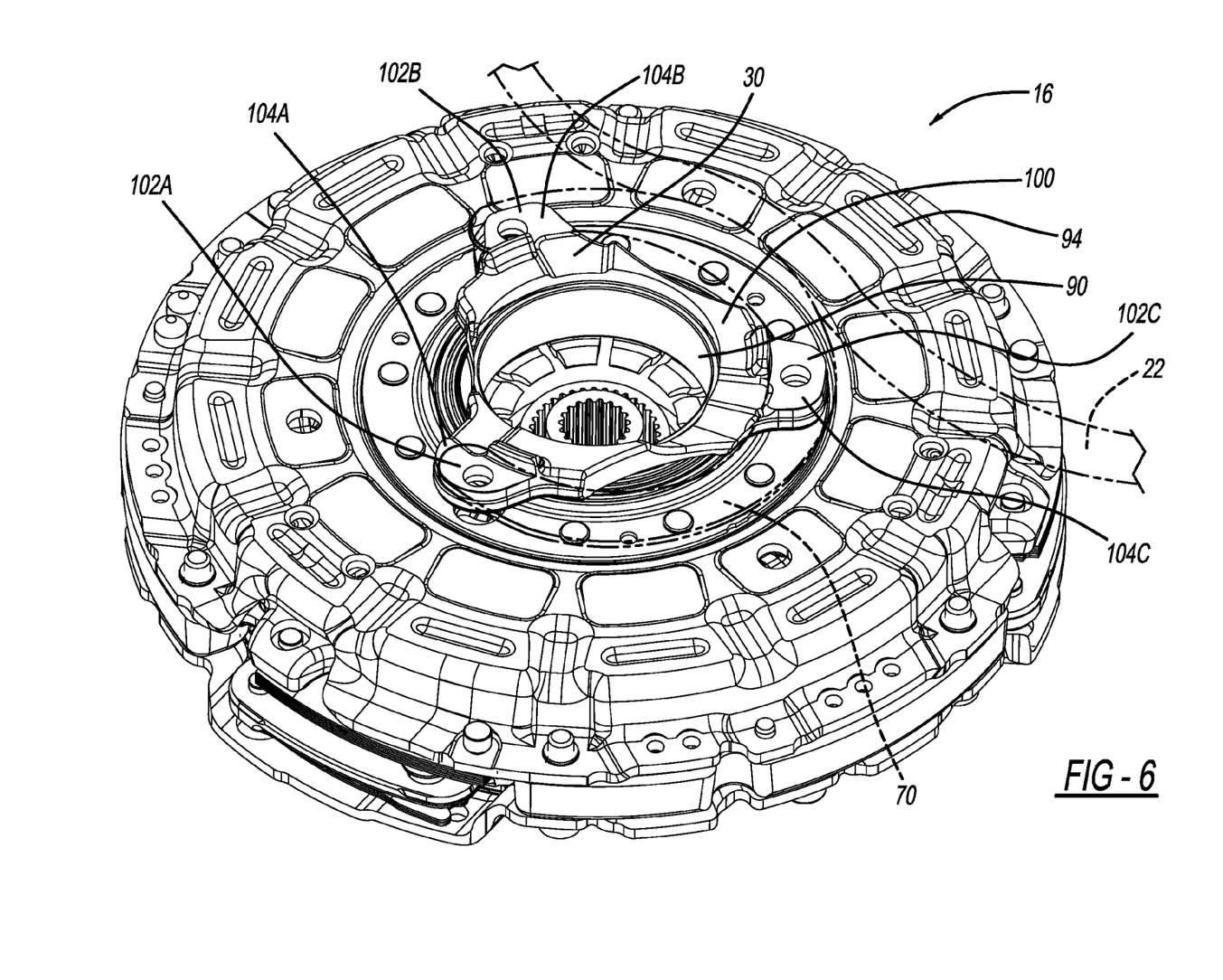
FIG. 6 is a front perspective view of the dual clutch assembly shown with the coolant tube and mounting plate removed for illustrative purposes.
Figure 7:
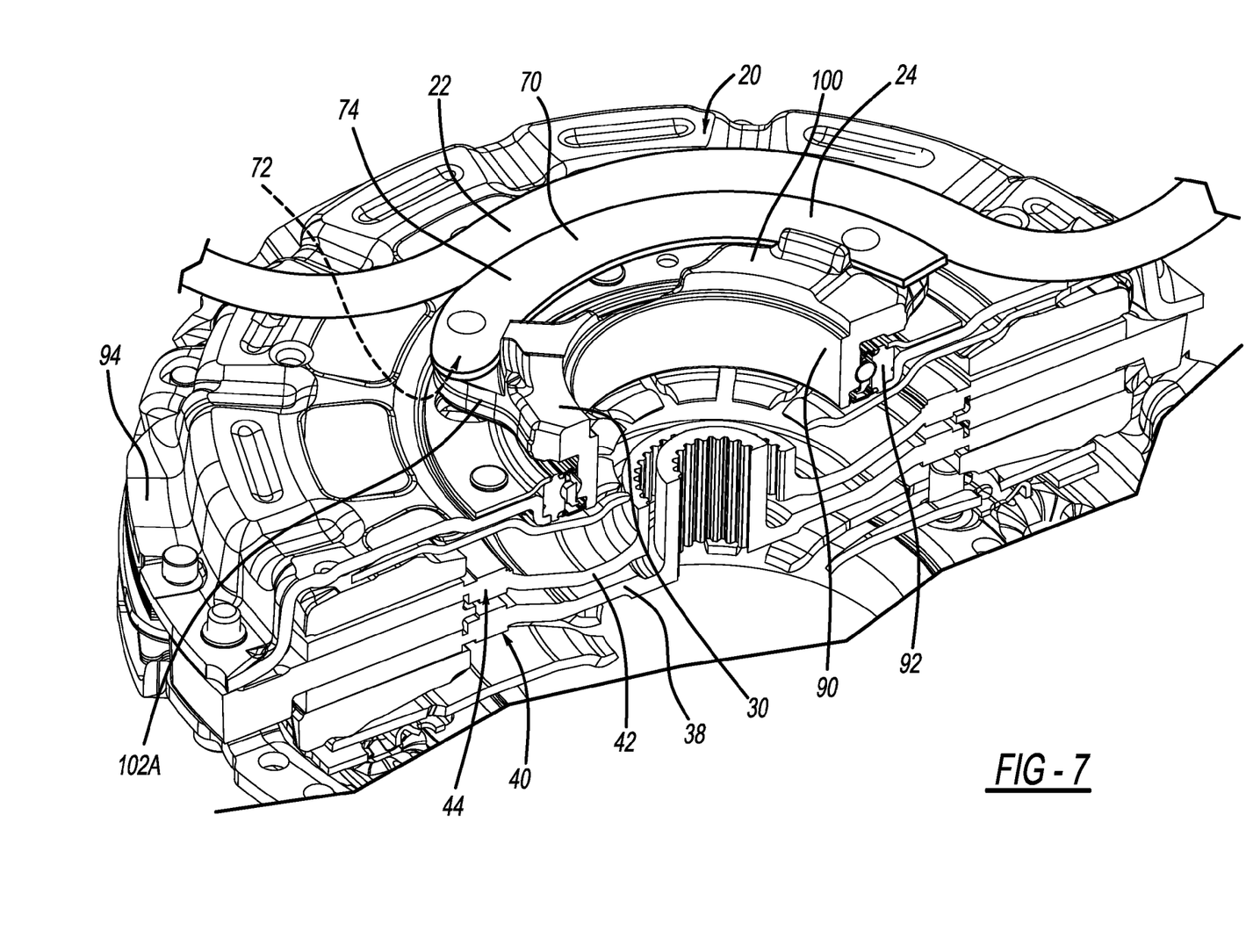
FIG. 7 is a cross-sectional view of the dual clutch assembly.

With initial reference to FIGS. 1, 4 and 7, a cooling system constructed in accordance with one example of the present disclosure is shown and generally identified at reference numeral 10. FIG. 1 is a front perspective view of a dual dry clutch transmission 10 having a transmission housing 12 that supports a dual clutch assembly 16 and incorporates a cooling assembly 20 (see also FIG. 4) according to the principles of the present disclosure. The cooling assembly 20 includes a coolant tube 22 and mounting plate 24 for cooling a support bearing 30 (see also FIGS. 5-7) that supports the dual clutch assembly 16. As will become appreciated from the following discussion, while the cooling assembly 20 is shown and described herein associated with the dual dry clutch transmission 10, the application is not so limited. In this regard, the cooling assembly 20 may be used in any transmission or clutch arrangement where it is desired to cool a component or series of components therein.

Figure 2:
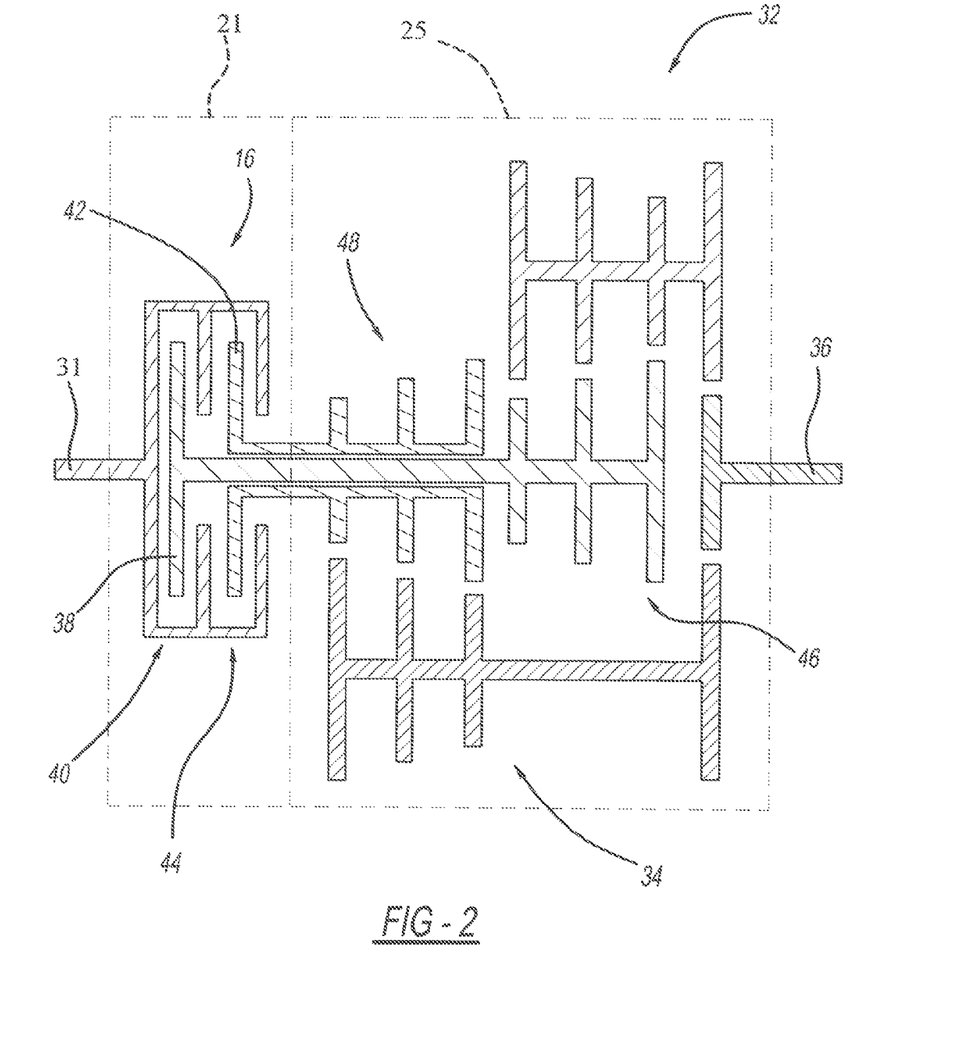
FIG. 2 is a schematic illustration of the dual dry clutch transmission of FIG. 1.

Referring now to FIG. 2, a brief description of the dual dry clutch transmission 10 will be provided. The dual dry clutch transmission 10 shown in this example is a six-speed transmission although other gearing arrangements for achieving other speeds may be employed. The dual dry clutch transmission 10 generally includes a clutch portion 21 and a transmission portion 25. The clutch portion 21 receives a rotatable input from a crankshaft 31 and transfers the rotatable motion to the dual clutch assembly 16. The transmission portion 25 includes a first gear set 32 associated with odd gears and a second gear set 34 associated with even gears. The transmission portion 25 converts the rotational output from the dual clutch assembly 16 to rotation, in various gear ratios, of an output shaft 36.

In general, the dual dry clutch transmission 10 functions as a manual transmission with a first clutch disk 38 of a first drive clutch 40 and a second clutch disk 42 of a second drive clutch 44. The two clutch disks 38 and 42 are both independently driven by a common flywheel assembly. The odd numbered gears (1, 3 and 5) associated with the first gear set 32 cooperate with a first shaft assembly 46. The first shaft assembly 46 rotates with the first clutch disk 38. The even numbered gears (2, 4 and 6) associated with the second gear set 34 cooperate with a second shaft assembly 48. During operation, the first gear set 32 and the second gear set 34 run in parallel with each having its own drive clutch 40 and 44, respectively. The selection and engagement of subsequent gears occurs concurrently to a previous gear remaining engaged.

Figure 3:
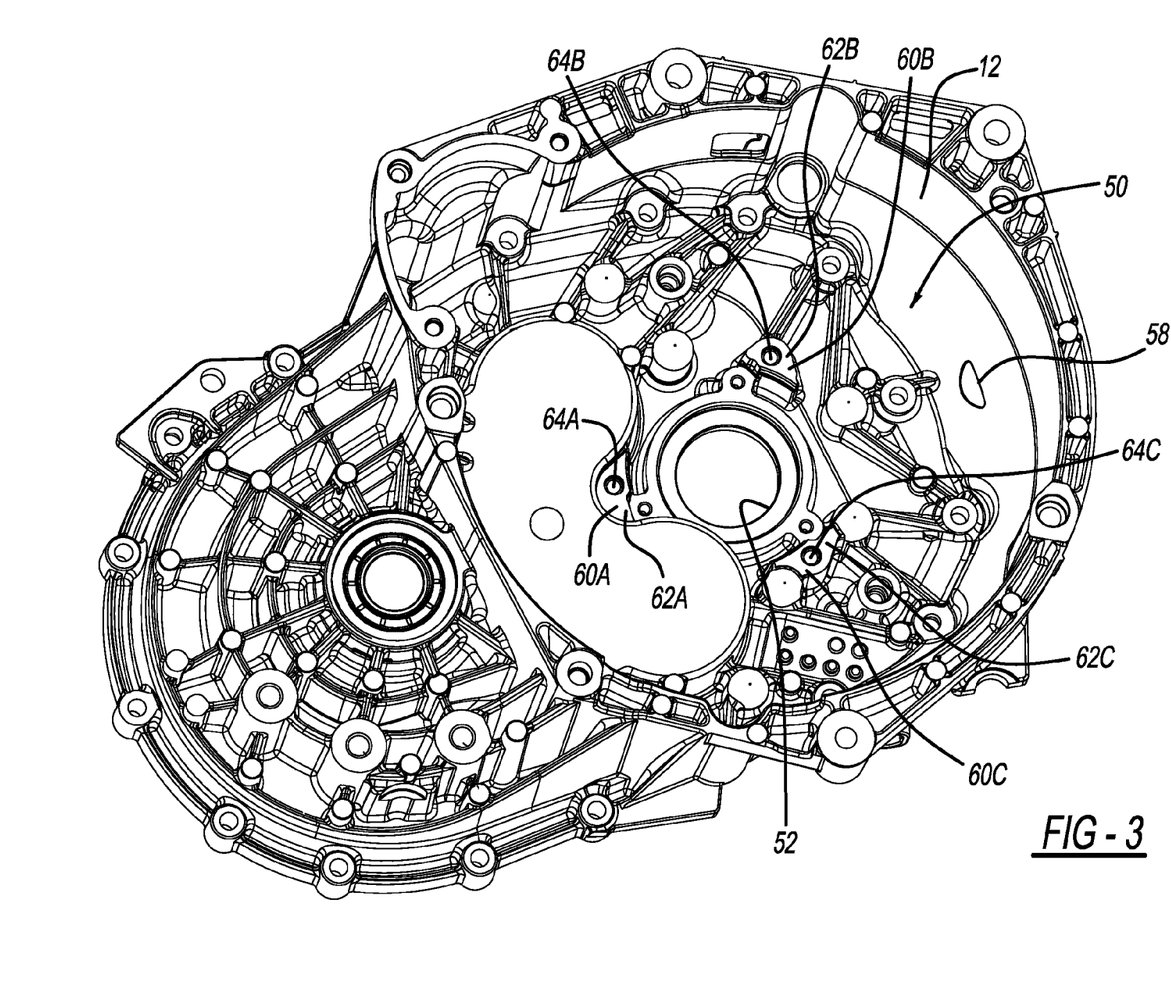
FIG. 3 is a front perspective view of the transmission housing of FIG. 1 and shown with the dual clutch assembly, coolant tube and mounting plate removed for illustrative purposes.

With additional reference now to FIGS. 3 and 4, additional features of the transmission housing 12 will be described. The transmission housing 12 generally defines a recess 50 configured for receipt of the dual clutch assembly 16. The transmission housing 12 further defines a passage 52 for receipt of the drive shafts associated with the first and second shaft assemblies 46 and 48. An opening 58 is defined through the transmission housing 12 for receipt of the coolant tube 22 (FIG. 4). The transmission housing 12 further comprises a series of mounting platforms 60A, 60B and 60C. Each mounting platform 60A, 60B and 60C includes a platform mounting surface 62A, 62B and 62C. An aperture 64A, 64B and 64C may be defined in the respective mounting platforms 60A, 60B and 60C. It will be appreciated that the configuration and arrangement of the mounting platforms 60A, 60B and 60C is merely exemplary. In this regard, the transmission housing 12 may incorporate other mounting geometries for cooperating with the cooling assembly 20.

Figure 5:
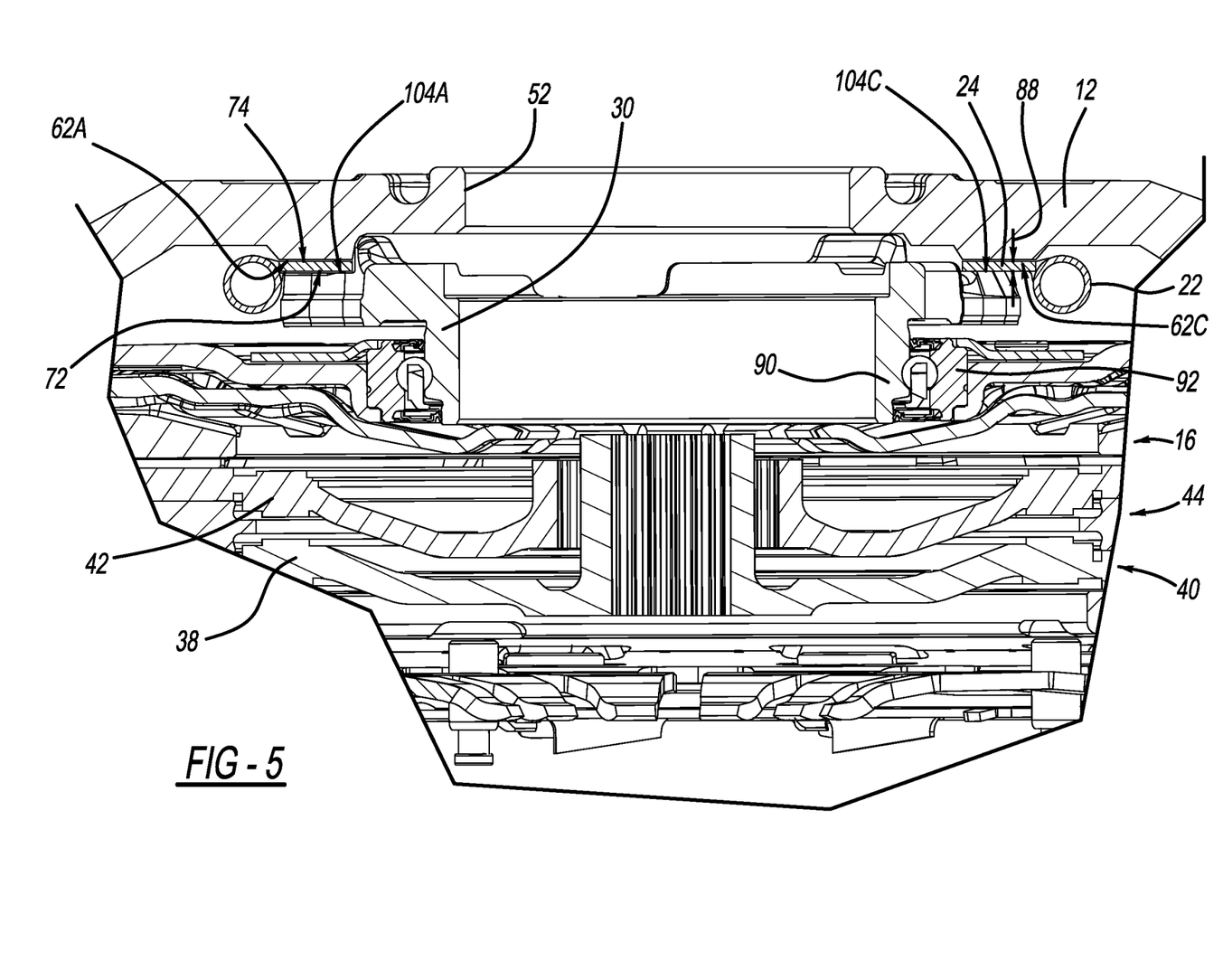
FIG. 5 is a cross-sectional view of the transmission housing, coolant tube and mounting plate of FIG. 4.

With specific reference to FIGS. 4 and 5, the cooling assembly 20 will be further described positioned on the transmission housing 12. In general, the mounting plate 24 of the cooling assembly 20 is sandwiched between the transmission housing 12 and the support bearing 30. The mounting plate 24 is mounted onto the platform mounting surfaces 62A, 62B and 62C of the mounting platforms 60A, 60B and 60C. The mounting plate 24 may be fitted onto the mounting platforms 60A, 60B and 60C and held in place subsequent to assembly of the dual clutch assembly 16. Alternatively the mounting plate 24 may be directly secured to the mounting platforms 60A, 60B and 60C by fasteners or other coupling process.

With reference now to FIGS. 4-7, the mounting plate 24 will be further described. The mounting plate 24 includes a plate body 70 having a bearing opposing surface 72 (FIG. 5) and a transmission housing opposing surface 74. The bearing opposing surface 72 is configured to directly contact the support bearing 30 (FIG. 7) to promote heat transfer as will be described further herein. The mounting plate 24 further includes a first end 80 (FIG. 4), a second end 82 and an intermediate portion 84 that connects the first end 80 and the second end 82.

The plate body 70 has a generally crescent shape that wraps around a substantial portion of the passage 52 and the support bearing 30. The mounting plate 24 is formed of metallic material such as, but not limited to stainless steel. In the example shown, the mounting plate 24 has a thickness 88 (FIG. 5) measured between the bearing opposing surface 72 and the transmission housing opposing surface 74. The thickness 88 is chosen to minimize necessary alterations in geometry of the support bearing 30 and the transmission housing 12 to accommodate the mounting plate 24. The thickness 88 is generally between 1 and 2 mm. In the particular example shown, the thickness 88 is 1.6 mm. The transmission housing 12 may be machined a complementary amount to accommodate for the added thickness. Alternately, the transmission housing 12 may be cast or forged into a geometry predetermined to accommodate the mounting plate 24. In this regard, the tolerances between the transmission housing 12 and the support bearing 30 may adequately accommodate the mounting plate 24 without a secondary modification step.

With particular reference now to FIGS. 5 and 6, the support bearing 30 will be further described. The support bearing 30 generally includes an inner body portion 90 and an outer body portion 92. The inner body portion 90 remains fixed relative to the transmission housing 12 while the outer body portion 92 is mounted for concurrent rotation with a housing 94 (FIG. 6) of the dual clutch assembly 16.

The inner body portion 90 includes a mounting collar 100 configured to securely mount relative to the transmission housing 12. The mounting collar 100 further includes a series of lobes 102A, 102B and 102C. The lobes 102A, 102B and 102C each include a lobe mounting surface 104A, 104B and 104C that collectively engages the bearing opposing surface 72 of the mounting plate 24 (see FIG. 7). The lobes 102A, 102B and 102C extend around the mounting collar 100 about 120 degrees relative to each other. The plate body 70 extends a sufficient radial distance to contact all of the lobe mounting surfaces 104A, 104B and 104C of the respective lobes 102A, 102B and 102C. In this way, the intermediate portion 84 (FIG. 4) of the plate body 70 wraps around a substantial portion (more than half) of the support bearing 30 further improving heat transfer characteristics. The plate body 70 may be fitted onto the lobes 102A, 102B and 102C and held in place subsequent to assembly of the dual clutch assembly 16. Alternatively, the plate body 70 may be directly secured to the lobes 102A, 102B and 102C by fasteners or other coupling process.

With particular reference now to FIGS. 4 and 7, the coolant tube 22 will be further described. The coolant tube 22 generally includes an inlet end 112, an outlet end 114 and an intermediate heat transfer portion 116 incorporated between the inlet end 112 and the outlet end 114. The inlet end 112 receives a cooling medium from a vehicle cooling system 120. The vehicle cooling system 120 can include an engine coolant system 120 from an internal combustion engine. In such an example, the cooling medium includes engine coolant. The vehicle cooling system 120 can alternatively include a vehicle heating ventilation and cooling (HVAC) system. In such an example, the cooling medium may be cooling mediums associated with HVAC such as Freon for example. In this regard, while the vehicle cooling system 120 has been referred to herein generally as an engine coolant system, other vehicle cooling systems are contemplated. The outlet end 114 returns the cooling medium to the vehicle cooling system 120. The heat transfer portion 116 of the coolant tube 22 is attached to the mounting plate 24. In this regard, coolant communicated through the coolant tube 22 reduces the temperature of the mounting plate 24 and therefore the support bearing 30.

The coolant tube 22 can be formed of metal such as, but not limited to copper. In one example, the coolant tube 22 is attached to the mounting plate 24 by a metal-joining process such as brazing. The metal-joining process creates a bond between the coolant tube 22 and the mounting plate 24 that not only facilitates strong coupling properties but also promotes heat transfer properties between the coolant tube 22 and the mounting plate 24. By way of non-limiting example, the cooling system 20 can be configured to reduce the temperature of the support bearing 30 about 10%. For example, a support bearing 30 having a temperature of 140 degrees Celsius can be reduced to around 125 degrees Celsius, or less by running engine coolant having a temperature between 90 and 110 degrees Celsius. Again, other temperatures and ranges are contemplated.

The coolant tube 22 further includes a first connecting portion 130 and a second connecting portion 132. The first connecting portion 130 connects the inlet end 112 to the heat transfer portion 116. The second connecting portion 132 connects the heat transfer portion 116 to the outlet end 114.

The coolant tube 22 passes through the opening 58 at the first and second connecting portions 130 and 132 (FIG. 4). The first and second connecting portions 130 and 132 may be routed in any manner suitable for the packaging constraints of a particular transmission.

It should be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A cooling assembly fluidly communicating with a vehicle cooling system, the cooling assembly configured for cooling a support bearing disposed in a dual clutch transmission having a fixed transmission housing, the cooling assembly comprising: a coolant tube having (i) an inlet end that receives a cooling medium from the vehicle cooling system, (ii) an outlet end that returns the cooling medium to the vehicle cooling system and (iii) a heat transfer portion incorporated between the inlet end and the outlet end; a mounting plate fixed relative to the transmission housing, the mounting having a plate body including a bearing opposing surface and a transmission housing opposing surface, wherein the bearing opposing surface contacts the support bearing; and wherein the heat transfer portion of the coolant tube is attached to the mounting plate such that coolant communicated through the coolant tube reduces temperature of the mounting plate and therefore the support bearing.

2. The cooling assembly of claim 1 wherein the mounting plate is directly coupled to the transmission housing.

3. The cooling assembly of claim 1 wherein the coolant tube is configured to pass through an opening defined in the transmission housing.

4. The cooling assembly of claim 1 wherein the coolant tube and the mounting plate are both formed of metal.

5. The cooling assembly of claim 4 wherein the coolant tube is attached to the mounting plate by a metal-joining process.

6. The cooling assembly of claim 5 wherein the mounting plate further includes a first end, a second end and an intermediate portion that connects the first and second ends, the plate body having a generally crescent shape.

7. The cooling assembly of claim 6 wherein the mounting plate body extends about more than half of a circumference of the support bearing.

8. The cooling assembly of claim 6 wherein the bearing opposing surface of the mounting plate body is configured to engage three lobes radially extending from the support bearing, the lobes extending about 120 degrees relative to each other.

9. The cooling assembly of claim 5 wherein the coolant tube is brazed to the mounting plate.

10. The cooling assembly of claim 4 wherein the coolant tube is formed of copper and the mounting plate is formed of stainless steel.

11. The cooling assembly of claim 10 wherein the mounting plate has a thickness measured between the bearing opposing surface and the transmission opposing surface of between 1 and 2 mm.

12. A cooling assembly fluidly communicating with a vehicle cooling system, the cooling assembly configured for cooling a support bearing disposed in a dual clutch transmission having a fixed transmission housing, the cooling assembly comprising: a coolant tube having (i) an inlet end that receives a cooling medium from the vehicle cooling system, (ii) an outlet end that returns the cooling medium to the vehicle cooling system and (iii) a heat transfer portion incorporated between the inlet end and the outlet end; a mounting plate mounted to the transmission housing the mounting plate having a crescent shaped plate body that extends between a first plate end and a second plate end, the plate body having an intermediate portion that wraps around a substantial portion of the support bearing, the mounting plate including a bearing opposing surface and a transmission housing opposing surface, wherein the bearing opposing surface contacts the support bearing; and wherein the heat transfer portion of the coolant tube is coupled to the intermediate portion of the mounting plate such that cooling medium communicated through the coolant tube reduces temperature of the mounting plate and therefore the support bearing.

13. The cooling assembly of claim 12 wherein the bearing opposing surface of the mounting plate body is configured to engage three lobes radially extending from the support bearing, the lobes extending about 120 degrees relative to each other such that the intermediate portion of the plate body wraps around more than half of the support bearing.

14. The cooling assembly of claim 12 wherein the coolant tube is configured to pass through an opening defined in the transmission housing.

15. The cooling assembly of claim 12 wherein the mounting plate is formed of stainless steel and the coolant tube is formed of copper, wherein the coolant tube is brazed to the mounting plate facilitating heat transfer properties between the mounting plate and the coolant tube.

16. A dual clutch transmission comprising: a fixed transmission housing; a dual clutch assembly disposed in the transmission housing; a support bearing coupled to the transmission housing and supporting the dual clutch assembly; a mounting plate coupled to the transmission housing such that the mounting plate is fixed relative to the transmission housing, the mounting plate having a bearing opposing surface thermally coupled to the support bearing; and a coolant tube coupled to the mounting plate and configured to receive coolant from a vehicle cooling system to reduce the temperature of the mounting plate and therefore the support bearing.

17. The dual clutch transmission of claim 16, wherein the coolant tube is coupled to an outer surface of the mounting plate.

18. The dual clutch transmission of claim 16, wherein the support bearing includes an inner body portion coupled to the transmission housing and fixed relative thereto, and an outer body portion mounted for concurrent rotation with an assembly housing of the dual clutch assembly.

19. The dual clutch transmission of claim 18, wherein the inner body portion includes a mounting collar coupled to the transmission housing.

20. The dual clutch transmission of claim 19, wherein the mounting collar is tri-lobular and each lobe includes a lobe mounting surface receiving and directly contacting the bearing opposing surface.

* * * * *